July 11, 1961  A. E. HAYES, JR  2,992,422
METHOD AND SYSTEM FOR DETERMINING MISS DISTANCE
Filed July 1, 1957  3 Sheets-Sheet 1
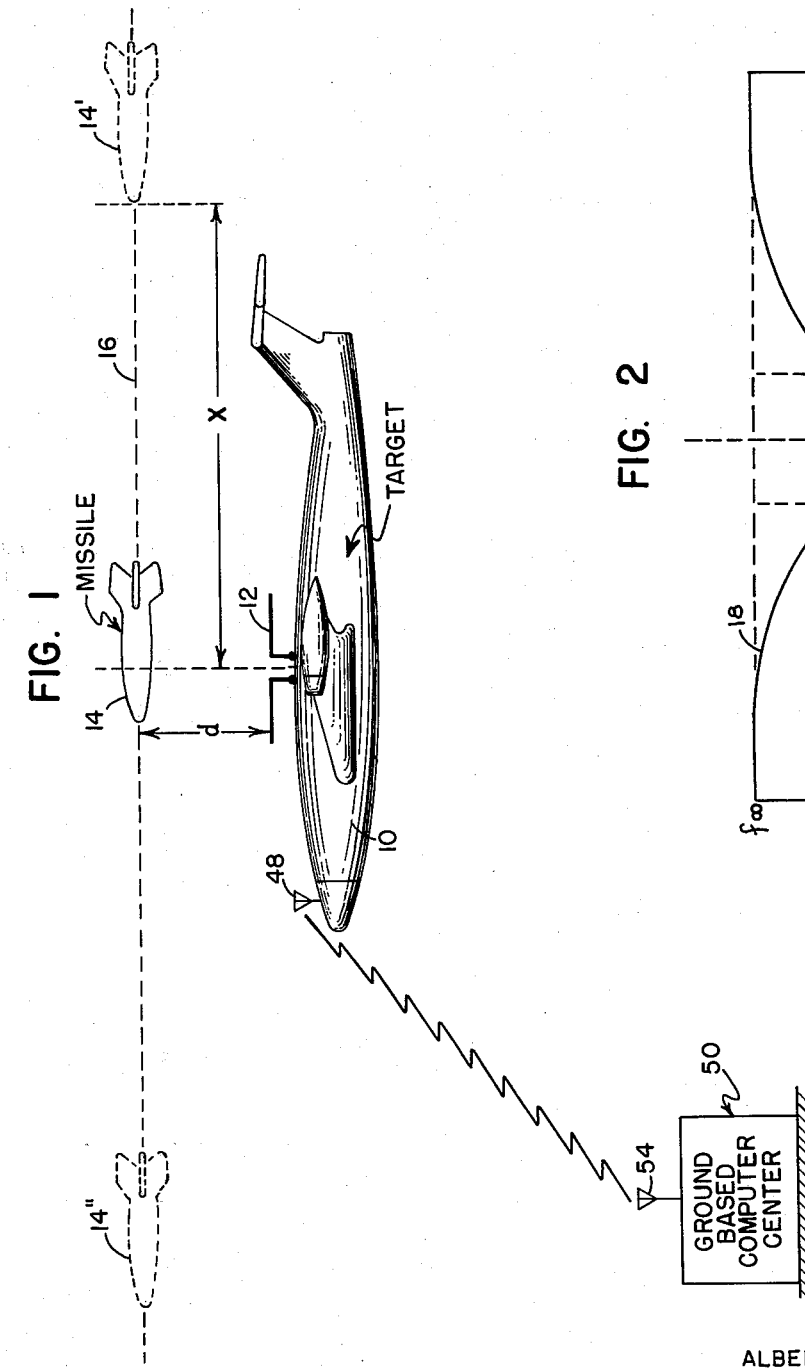
INVENTOR.
ALBERT E. HAYES, JR.
BY
*Stuart R. Peterson*
ATTORNEY

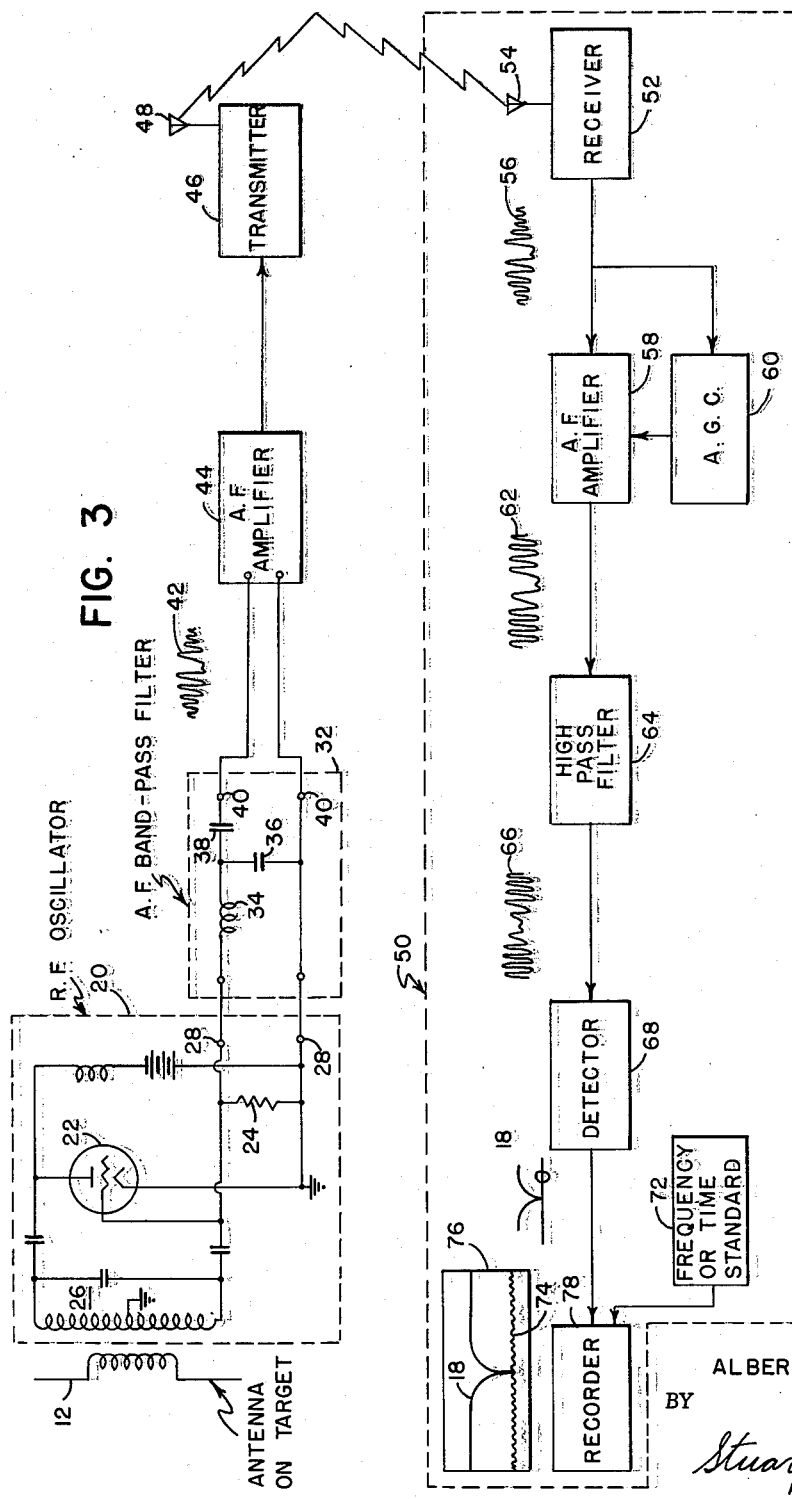

July 11, 1961

A. E. HAYES, JR 2,992,422

METHOD AND SYSTEM FOR DETERMINING MISS DISTANCE

Filed July 1, 1957

INVENTOR.
ALBERT E. HAYES, JR.
BY
*Stuart R. Peterson*
ATTORNEY

United States Patent Office 2,992,422
Patented July 11, 1961

2,992,422
METHOD AND SYSTEM FOR DETERMINING MISS DISTANCE
Albert E. Hayes, Jr., St. Paul, Minn., assignor to General Mills, Inc., a corporation of Delaware
Filed July 1, 1957, Ser. No. 669,031
8 Claims. (Cl. 343—6)

This invention relates generally to a method and system for determining the miss distance between two relatively moving objects and the invention will find especial utility in ascertaining the minimum approach distance between a missile and its intended target.

Accordingly, an important object of the present invention is to provide sufficient data desired from the relative movement between a missile and its intended target from which the miss distance or distance of closest approach between the missile and target may be determined. More specifically, it is an aim of the invention to measure the radiation resistance of an antenna or other electromagnetic wave signal radiating device mounted on the target while the missile is approaching, passing, and leaving the target.

Another object of the invention is to provide a method and system for determining the miss distance between a missile and target that is independent of the size and shape of the missile.

A further object is to provide a system of the above character that will be relatively simple, requiring only a comparatively small amount of equipment that can readily be mounted on the target. This is of especial advantage if the target is to be airborne.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIGURE 1 is a schematic view in elevation depicting the path of a missile relative to its target, the letter "$x$" denoting the missile path and the letter "$d$" indicating the miss distance between the missile and target;

FIG. 2 is a graphical representation of the frequency "$f$" of the alternating component of antenna resistance with respect to time "$t$" or the distance "$x$," the missile being assumed to be travelling at a constant velocity;

FIG. 3 is a schematic electrical diagram, partly in block form, illustrating one over-all system that the invention may assume, various waveforms having been superimposed thereon to aid in understanding the functions performed by the different components.

Figure 4:
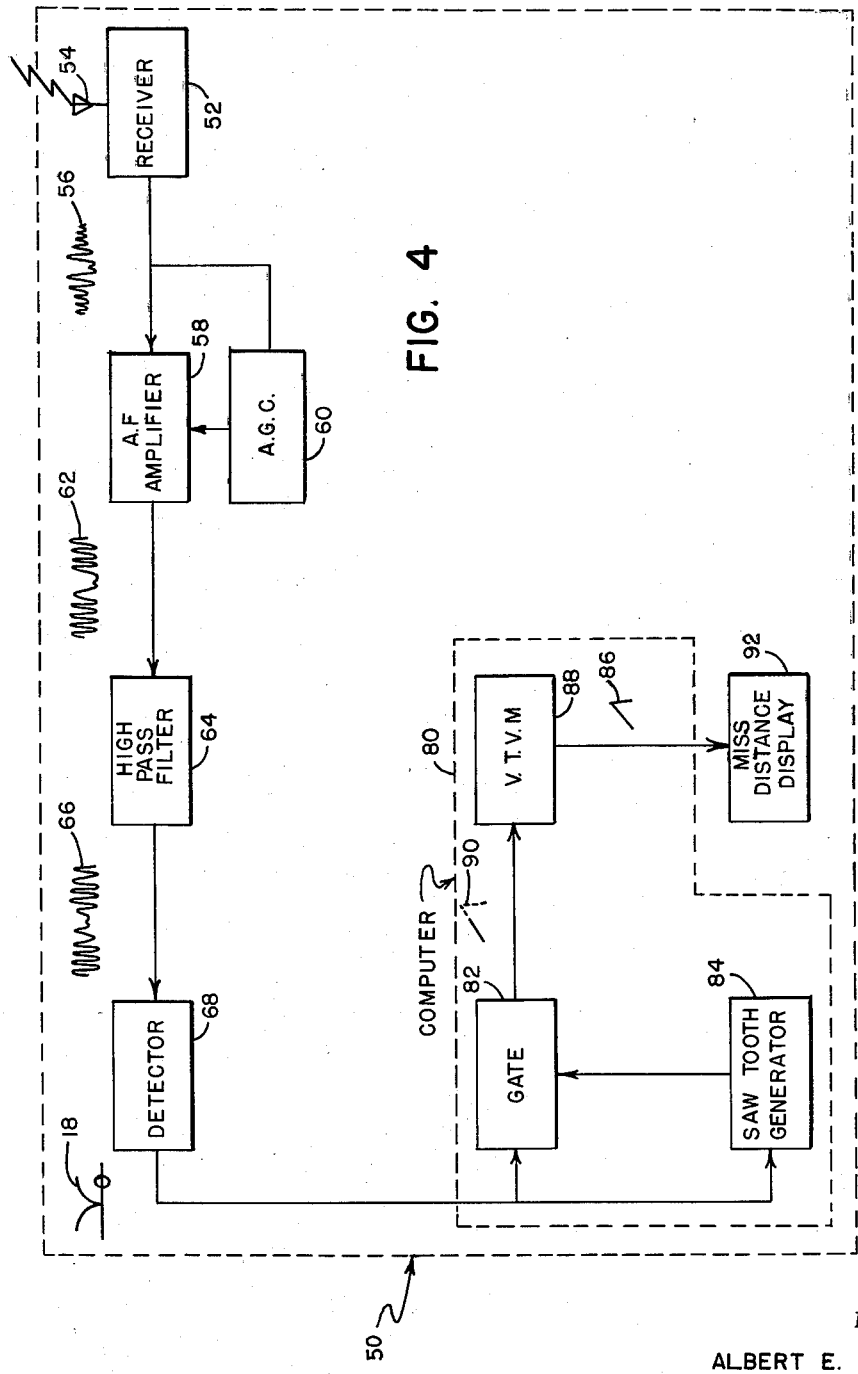
FIG. 4 is a somewhat different modification of FIG. 3, this view involving the incorporation of a computer into the system.

Before describing in detail the drawings, it is believed highly desirable to explain in general terms the basic principles underlying the invention. With these fundamental concepts in mind an understanding of the ensuing detailed description of the method and system will be greatly facilitated. Accordingly, it may be stated that it is well known, to those skilled in the art, that the radiation, or terminal resistance of an antenna is determined both by the characteristics and dimensions of the antenna itself, and by its environment. If the characteristics and dimensions of an antenna are held fixed, the resistance of that antenna, as measured at its terminals, becomes a function of its surroundings. It is understood that the radiation resistance of an antenna is a variable dependent on the frequency at which it is measured, and therefore the term radiation resistance as used hereafter presupposes the selection of a frequency corresponding to a wavelength of the same order of magnitude as the length of the antenna in question. With the above relationships in mind, it can be shown that the radiation resistance of an antenna in the vicinity of a moving object will contain an alternating current component having an audio-frequency which is a function of the velocity of the moving object with respect to the antenna. This alternating component of resistance will be discussed further in a subsequent portion of this specification.

It will be manifest that at the instant of closest approach, when the missile is passing the target, the above described audio-frequency-varying component of radiation resistance will have zero frequency, since there is no relative motion at that instant, and at all other times the frequency will be other than zero. This frequency variation does not depend in any way on the size or shape of the moving object, but only on its relative velocity and path.

The measurement of this alternating component of radiation resistance is accomplished most simply by the use of a radio-frequency self-excited oscillator coupled to the antenna. With such an arrangement the amplitude of the grid bias voltage developed across a grid-leak resistor will be, in part, a function of the magnitude of the resistance coupled into the tuned circuit. In the instant case, that resistance is an alternating component of radiation resistance, hence the bias voltage will contain an alternating component just as the radiation resistance does.

That alternating component of bias voltage contains all of the signal information necessary to determine the point of closest approach between a missile and a target. Many embodiments of the instant invention are possible, and the single embodiment shown in the appended drawings and described in later portions of this specification is selected to demonstrate one mechanization of the invention without any intention of limiting its scope.

Referring now in detail to the drawings and first to FIG. 1, there is illustrated a target in the form of an airplane 10 carrying thereon an antenna 12. A missile 14 is depicted as flying at a constant velocity along a path 16. The solid line position of the missile is indicative of when the missile 14 is closest to the target 10. The right-hand phantom line position, designated 14', shows the missile in an approach position, whereas the left-hand flight position, denoted 14'', illustrates the position of the missile after it has passed beyond the target.

The radiation resistance of the antenna 10 is of a magnitude $R_{11}$, which is a function only of the antenna 12 itself and its unmoving surroundings, plus a second term $R_{21}$, which is approximately equal to:

$$R_{21} = 30 \left\{ 2Ci\left(\frac{2\pi d}{\lambda}\right) - Ci\left[\frac{2\pi}{\lambda}(\sqrt{d^2 + K^2} + K)\right] - Ci\left[\frac{2\pi}{\lambda}(\sqrt{d^2 + K^2} - K)\right] \right\}$$

where $d$=instantaneous distance between antenna and object.
$K$=a quantity dependent on the size, shape, aspect, and conductivity of the moving object.
$\lambda$=wavelength corresponding to the frequency at which the measurement is made.
$Ci$=cosine integral of the particular function that follows.

From consideration of the above, it will be manifest that while the magnitude of $R_{21}$ will be a function of the characteristics of the missile 14, the frequency of the variation of $R_{21}$ will be dependent only on the velocity of the missile with respect to the antenna 12, and to the wavelength of measurement.

In rectangular coordinates, in accordance with the coordinates illustrated in FIG. 1, the alternating component of $R_{21}$ will be of frequency $f$, defined as:

$$f = \frac{2v}{\lambda} \cdot \frac{1}{\sqrt{1+\left(\frac{d}{x}\right)^2}}$$

where:

$v$=relative velocity of missile and antenna.
$d$=distance at closest approach.
$x$=instantaneous position of missile; its distance, measured along its flight path, between the missile and its point of closest approach to the antenna.

It will be seen from a consideration of the above, that $f$ will be at its maximum, i.e., equal to $$\frac{2v}{\lambda}$$

when $x$ is very large with respect to $d$, and that $f$ will equal zero as $x$ swings from a very small "approach" value to a very small "depart" value. This relationship is illustrated in FIG. 2.

Referring specifically to FIG. 2, there is illustrated a plot or curve 18 of the frequency $f$ of the alternating component of $R_{21}$ with respect to the distance $x$. Since the velocity is assumed to be constant, this $x$-axis is, identically, a time axis illustrating the variation of $f$ with respect to time. The point $t_0$ designates the time when $f=0$, while $t_1$ and $t_2$ designate the instants when the frequency is equal to ½ the frequency at a great distance ($f_\infty$).

It can be shown that the distance $d$ at closest approach is:

$$d = \sqrt{\frac{3}{2}} \cdot \lambda \cdot f_\infty (t_2 - t_0)$$

Thus the miss distance or distance of closest approach $d$ can be derived from an analysis of the variation with time of the alternating component of radiation resistance.

In FIG. 3 there is illustrated a complete system for effecting the objects of the invention. Included in this system is an R.F. oscillator 20 comprising a vacuum tube 22 in a conventional Hartley circuit. A grid leak resistor 24 provides the necessary grid bias for the operation of the oscillator. The previously referred to antenna 12 is coupled to the tank circuit 26 of the oscillator. A pair of terminals 28 is connected to the ungrounded and grounded ends of the resistor 24. The voltage between the terminals 28 comprises several components; an R.F. voltage of oscillator frequency, a D.C. voltage which is a function of the characteristics of the circuit and components, and a varying component caused by motion of any object in the neighborhood of the antenna 12, of frequency $f$, as defined above. It is this frequency $f$ which contains the miss distance information. The R.F. and D.C. components may be removed by conventional filtering methods, and the signal of frequency $f$ may be extracted to be used to obtain miss distance information.

One type of filter 32 suitable for extracting the frequency $f$ is included in the circuitry set forth in FIG. 3. This filter 32 includes an inductor 34 acting as an R.F. choke at the frequency of the oscillator 20, a capacitor 36 acting as a by-pass having a low impedance at the R.F. frequency generated by the oscillator and a capacitor 38 serving to block the D.C. component of bias voltage while passing the signal voltage at frequency $f$. Thus, the signal varying in accordance with the frequency $f$ will appear alone at a pair of output terminals 40, its waveform having been designated by the numeral 42.

Amplification of the A.F. signal 42 is achieved by means of an amplifier 44.

For the purpose of more fully explaining the potentialities of my system, it has been assumed that the target 10 is airborne, it having been stated that said target is a plane. Therefore, the output signal from the amplifier 44 is fed to a telemetering transmitter 46 equipped with an antenna 48, this antenna 48 appearing in both FIGS. 1 and 3. Thus, the antenna 12, the oscillator 20, the amplifier 44, and the transmitter 46 will all be carried on the target 10 itself. However, the total weight of these components, including the power supply, is less than five pounds and occupies a space of less than 150 cubic inches.

Under the foregoing circumstances it is within the purview of the invention to locate the bulk of the equipment at a land-based computing center indicated only generally in FIG. 1 by the numeral 50. However, from FIG. 3 it will be discerned that the computing center houses a receiver 52 provided with an antenna 54, this antenna 54 also having been pictured in FIG. 1. The receiver 52 of course receives the telemetered signals sent from the transmitter 46. Thus, the A.F. signal 42 is modulated with an R.F. signal at the transmitter 46 and the transmitted signal is demodulated at the receiver 52. The demodulated signal has been given the numeral 56 and it will be recognized that the waveform of this signal 56 resembles the pre-amplified signal 42 as far as configuration is concerned, only an amplification, modulation, and demodulation having been interposed for telemetering purposes.

It will be observed that the signal 56 is delivered to an A.F. amplifier 58 and that it varies in both amplitude and frequency. Due to the fact that we are interested in only the frequency, the amplifier 58 has associated therewith an automatic volume control circuit 60 so that the output from the amplifier will possess a shape corresponding to the signal 62, the voltage swings being all of the same magnitude although differing in frequency as is readily discernible.

Next, it is desired to obtain an analog signal that will represent the frequency changes on an amplitude varying basis. To this end, the output signal 62 from the amplifier 58 is fed to a high-pass filter 64 which readily passes the higher A.F. frequencies contained in the signal 62 but not the very low frequencies, i.e., those close to zero. Consequently, the resulting output from the filter 64 appears as a signal 66. By delivering this signal 66 to a suitable detector 68 the alternating A.F. component is removed, leaving only the previously alluded to signal 18, which is a D.C. one.

The actual determination of the miss distance may be accomplished by feeding the signal 18 into a recorder 78. Associated with the recorder 78 is a constant frequency or time standard source 72 which applies a time base signal 74 to the record which has been labeled 76. With both the signal 18 and the signal 74 appearing on the same record 76 it can be readily appreciated that points $t_2$ and $t_0$ can be noted and that their difference can be substituted in the formula for determining the miss distance $d$. In this regard, it will be appreciated that $\lambda$ and $f_\infty$ will be known constants for a given situation.

On the other hand, the signal 18 may, if preferred, be fed to a suitable computer 80 as exemplified in FIG. 4. Actually, FIG. 4 represents the same basic system as does FIG. 3 but with the computer 80 having been substituted for the recorder 78. For drawing simplicity, however, only that equipment located at the computing center 50 has been pictured. The computer, it must be realized, may assume a variety of forms. As illustrated, the computer 80 comprises a gate circuit 82 that is normally closed but which automatically opens when the voltage of signal 18 drops to a value corresponding to $f_\infty/2$ at $t_1$ and then closes when the voltage again rises to that value, again corresponding to $f_\infty/2$ but at $t_2$. Stated somewhat differently, the gate 82 is open during the interval between $t_1$ and $t_2$. Inasmuch as the entire interval between $t_1$ and $t_2$ is used in this instance, it becomes evident that the equation for determining $d$ is:

$$d = \sqrt{\frac{3}{4}} \cdot \lambda \cdot f_\infty \cdot (t_2 - t_1)$$

Simultaneously with the opening of the gate 82 a sawtooth generator 84 is energized so as to impress a sawtooth wave 86 on a recording vacuum tube voltmeter 88 via a second input of said gate 82. It will be understood that the time duration of the sawtooth wave 86 is sufficient to embrace the maximum differences between $t_2$ and $t_1$ that might be encountered. In this regard, it will be discerned that the sweep of the output signal which has been labeled 90 from the gate 82 has been chopped off by means of the gate's closing before the upper point of the sawtooth has been reached. The maximum voltage value of the wave 84 is representative of $(t_2-t_1)$ for a given value of $\lambda$ and $f_\infty$. This voltage value can be converted to the miss distance $d$ by a simple scaling process, but for completeness of diagramming, a miss distance display meter or indicator 92 is shown which has been calibrated so as to indicate the constant corresponding to $$\sqrt{\frac{3}{4}} \cdot \lambda \cdot f_\infty$$

and thus display the miss distance in actual feet.

In view of the description included above, the method and system constituting my invention will be readily understood by those skilled in the art. In review, what transpires is that the rate of change of resistance of the antenna 12 is determined. The analog curve 18 is indicative of the way the antenna resistance varies as influenced by the passage of the missile 14 relative to the antenna 12. Therefore, the determination of the miss distance $d$ is solely a problem of computation once the curve 18 has been derived, inasmuch as this curve contains all of the information necessary for the computation. When the recorder 78 is employed, then the time trace 74 permits the scaling of the $(t_2-t_0)$ value which can be done rather quickly. Of course, use of the computer 80 gives even a more rapid determination of the time differential. As hereinbefore explained the $(t_2-t_1)$ interval has been employed for use in the computer, although the computer could be designed to function on the $(t_2-t_0)$ interval, if desired.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In a system for determining the miss distance between two relatively moving objects, an antenna on one of said objects, a radio frequency oscillator coupled to said antenna, said oscillator including a grid-leak resistor, means connected across said grid-leak resistor for deriving an audio-frequency voltage signal therefrom, and means for deriving miss distance information from said signal based on the rate of change of said signal.

2. In a system for determining the miss distance between two relatively moving objects, an antenna on one of said objects, means for feeding a radio frequency signal to said antenna, means for producing a signal in analog form denoting the variation in frequency with respect to time of the alternating current component of the radiation resistance of said antenna, and means for determining the rate of change of said analog signal as the other of said objects passes said one object.

3. In a system for determining the miss distance between a missile and target, an antenna on said target, means for feeding a radio frequency signal to said antenna, means for producing a signal varying in frequency in accordance with the alternating component of radiation resistance of said antenna, means for deriving an analog signal from said last-mentioned signal which has zero magnitude when said frequency is zero, and means for determining the rate of change of said analog signal in the region of its zero magnitude.

4. A system in accordance with claim 3 in which said rate of change determining means includes a recorder and a constant frequency source associated with said recorder.

5. A system in accordance with claim 4 in which said change determining means includes a computer.

6. In a system for determining the miss distance between a missile and target, an antenna carried by said target, oscillator means coupled to said antenna for propagating a radio frequency signal from said antenna, means for producing a signal in analog form denoting the variation in frequency with respect to time of the alternating component of the radiation resistance of said antenna, said analog signal having a substantially constant magnitude when said missile is at a relatively great distance from said target, said analog signal decreasing toward zero magnitude as said missile approaches said target, said analog signal having zero magnitude at the instant said missile passes said target, said analog signal increasing as said missile leaves said target and said analog signal again reaching said constant magnitude when said missile is again at a relatively great distance from said target, and means for obtaining an indication of the rate of change of said analog signal during at least one of said periods of decrease and increase for use in deriving said miss distance.

7. In a system for determining the miss distance between a missile in flight and an airborne target, an antenna on said target for propagating a radio frequency signal, means for deriving a signal that is an indication of the time rate of change of radiation resistance of said antenna, a land-based computing center, means for transmitting a signal from said target to said computing center which is indicative of said change of radiation resistance to said computing center, and means located at said computing center for determining the miss distance of said missile with respect to said target from the information contained in said transmitted signal.

8. In a system for determining the miss distance between a missile in flight and an airborne target, an antenna on said target, radio frequency oscillator means coupled to said antenna, said oscillator means including a grid-leak resistor, means connected across said grid-leak resistor for producing a signal varying in frequency with respect to time which is in accordance with the alternating component of the radiation resistance of said antenna, a ground-based computing center, means for transmitting a derivative of said alternating signal to said computing center, means at said computing center for producing from said transmitted signal a signal in analog form denoting the variation in frequency of said alternating frequency with respect to time, said analog signal having a substantially constant magnitude when said missile is at a relatively great distance from said target, said analog signal decreasing toward zero magnitude as said missile approaches said target, said analog signal having zero magnitude at the instant said missile passes said target, said analog signal increasing as said missile leaves said target and said analog signal again reaching said constant magnitude when said missile is again at a relatively great distance from said target, and obtaining an indication of the rate of change of said analog signal during at least one of said periods of decrease and increase for use in deriving said miss distance.

References Cited in the file of this patent

UNITED STATES PATENTS

| | | |
|---|---|---|
| 1,658,953 | Theremin | Feb. 14, 1928 |
| 2,020,347 | Ballantine | Nov. 12, 1935 |
| 2,022,517 | Patterson | Nov. 26, 1935 |
| 2,801,049 | Richmond | July 30, 1957 |
| 2,860,334 | Cowdery | Nov. 11, 1958 |
| 2,923,002 | Pielou | Jan. 26, 1960 |

FOREIGN PATENTS

| | | |
|---|---|---|
| 585,791 | Great Britain | Feb. 25, 1947 |
| 585,911 | Great Britain | Feb. 28, 1947 |

OTHER REFERENCES

Electronics, December 1945; pp. 98–103.